United States Patent
Auvray et al.

(10) Patent No.: US 10,526,247 B2
(45) Date of Patent: Jan. 7, 2020

(54) ADJUVANT FOR A CEMENT OR A REFRACTORY CONCRETE COMPOSITION, THE USES THEREOF, AND CEMENT AND REFRACTORY CONCRETE COMPOSITIONS

(71) Applicant: KERNEOS, Puteaux (FR)

(72) Inventors: Jean-Michel Auvray, Meyrie (FR); Farida Kebli, Chassieu (FR); Michael Lievin, Veyrins-Thuellin (FR); Kamel Benyahia, Pierre Benite (FR); Christoph Wohrmeyer, Dormagen (DE)

(73) Assignee: KERNEOS, Puteaux (FR)

( * ) Notice: Subject to any disclaimer, the term of this patent is extended or adjusted under 35 U.S.C. 154(b) by 0 days.

(21) Appl. No.: 15/568,760

(22) PCT Filed: Apr. 22, 2016

(86) PCT No.: PCT/EP2016/059048
§ 371 (c)(1),
(2) Date: Oct. 23, 2017

(87) PCT Pub. No.: WO2016/170135
PCT Pub. Date: Oct. 27, 2016

(65) Prior Publication Data
US 2018/0141864 A1     May 24, 2018

(30) Foreign Application Priority Data
Apr. 24, 2015 (FR) ..................... 15 53723

(51) Int. Cl.
| C04B 24/06 | (2006.01) |
| C04B 28/06 | (2006.01) |
| C04B 22/06 | (2006.01) |
| C04B 24/26 | (2006.01) |
| C04B 28/02 | (2006.01) |
| C04B 103/00 | (2006.01) |

(52) U.S. Cl.
CPC ............ *C04B 24/06* (2013.01); *C04B 22/066* (2013.01); *C04B 24/2641* (2013.01); *C04B 28/02* (2013.01); *C04B 28/06* (2013.01); *C04B 2103/0081* (2013.01)

(58) Field of Classification Search
CPC ............... C04B 24/06; C04B 24/2641; C04B 2103/0081; C04B 28/02; C04B 28/06; C04B 22/066
USPC .......................................................... 524/5
See application file for complete search history.

(56) References Cited

FOREIGN PATENT DOCUMENTS

| JP | 2000-203954 | * | 7/2000 |
| JP | 2000-203954 | A | 7/2000 |
| JP | 2003-201183 | A | 7/2003 |
| JP | 2004-307231 | A | 11/2004 |
| JP | 2013-249226 | A | 12/2013 |

OTHER PUBLICATIONS

International Search Report, dated Jul. 12, 2016, from corresponding PCT application No. PCT/EP2016/059048.

* cited by examiner

*Primary Examiner* — Hui H Chin
(74) *Attorney, Agent, or Firm* — Young & Thompson

(57) ABSTRACT

Disclosed is a cement or a refractory concrete composition, including, by weight, as compared to its total weight at least: (a) from 20% to 70% of at least one aluminum organic acid, (b) from 3% to 20% of at least one deflocculant chosen from a carboxylic acid polymer, a carboxylic acid, a salt thereof, or one of their combinations, and, (c) from 7% to 44% of at least one mineral oxide. Also disclosed is the use of such an adjuvant to improve the drying time of a refractory concrete composition or to improve the permeability of a refractory concrete composition, as well as a cement composition and to a refractory concrete composition, each including such an adjuvant.

20 Claims, 3 Drawing Sheets

ADJUVANT FOR A CEMENT OR A REFRACTORY CONCRETE COMPOSITION, THE USES THEREOF, AND CEMENT AND REFRACTORY CONCRETE COMPOSITIONS

TECHNICAL FIELD OF THE INVENTION

The present invention relates to the field of adjuvants for compositions based on hydraulic binders, such as cements or refractory concretes.

In particular, the invention relates to an adjuvant for a cement or a refractory concrete composition comprising a specific combination of an aluminum organic acid, a deflocculant and a mineral oxide, especially enabling to improve water drainage during the drying of refractory concretes.

The present invention also relates to a cement composition and to a refractory concrete composition comprising this adjuvant.

The invention further relates to the use of such an adjuvant to improve the drying time of a refractory concrete composition or to improve the permeability of a refractory concrete composition.

TECHNICAL BACKGROUND

Refractory concretes, in particular dense refractory concretes, are known for their outstanding properties of resistance to elevated temperatures (ranging from 300° C. to 1800° C.) and for this reason they are especially used for coating the furnaces in the iron and steel industry or for other applications under elevated temperatures. Indeed, furnaces must be able to withstand aggressive conditions of thermal, mechanical or chemical nature.

In general, refractory concrete is prepared by mixing, in a blending device, a refractory aggregate (tabular alumina, corundum, bauxite, magnesia, alumina silicates, dolomite, etc.), an aluminous binder, optionally ultrafine particles, such as silica fume or alumina powder, even one or more additives, such as a molding additive and mixing water. Once mixed, a fresh concrete is obtained which is easy handling and will be used so as to form the expected structure. The latter will then be left to harden upon drying. During this drying, the refractory concrete develops a certain amount of mechanical resistance (cure period). Then this hardening phase gives rise to a dehydration phase in the refractory concrete. This one leads to the removal of free water, as well as of crystallization water.

However, it appeared that the drying step due to an increase in temperature became problematic to prepare refractory concretes and in particular dense refractory concretes. This specific density certainly improves the corrosion resistance of refractory concretes, but it causes a problem in the drying step, since such specific density goes along with a poor permeability, which interferes with water drainage, that is to say with the removal of free water and crystallization water.

Indeed, the water amount that may be drained away by a material forming a sealed enclosure depends on the permeability of such material. It should be distinguished with the water amount, which try to escape from a material forming a sealed enclosure, at a given temperature and at a given pressure.

In general, for economic reasons, the drying step of refractory concretes has to be as quick as possible. To this end, the concretes often have to be heated, for example to a temperature coming close to 300° C. However, when the water amount which tries to escape from the refractory concrete is higher than the water amount actually drained away, then there is an explosion hazard. Indeed, free water and crystallization water that are removed lead to the formation of steam. If the temperature increase is too fast during the drying step, the steam pressure may exceed the mechanical resistance of the thus formed concrete and cause the explosion of the latter.

To date, to limit explosion hazards during the drying step of refractory concretes, a first solution consists in providing said refractory concretes with softer and slower heat cycles. These heat cycles extend the drying time and are economically not advantageous.

A second solution consists in modifying the permeability of the material, without excessively affecting its porosity, so as not to potentially embrittle said material.

Porosity corresponds to the volume of void existing within a material and the permeability corresponds to the manner with which these voids are arranged to each other. Increasing the porosity often results in a decrease in the mechanical resistance of a material, whereas increasing its permeability enables water to be drained away more easily upon drying.

One of the existing solutions to improve the permeability of the material consists in using polymer fibers (such as polypropylene or polyvinyl, etc.). However, this solution is only effective if the heating temperatures do exceed the fiber melting temperature. This solution does not reduce the explosion hazard, which appears as soon as the temperature of the material exceeds 100° C. Moreover, said fibers are difficult to disperse homogeneously within a dry concrete mix, that is to say wherein water has not yet been added thereto. The material which then becomes heterogeneous, has areas with a high explosion hazard. Lastly, to preserve the castability of a concrete comprising such fibers, it is necessary to add more water to the concrete formulation. But increasing the water amount in the formulation of a refractory concrete results in an increased porosity in the refractory concrete after drying. As a consequence, such a refractory concrete has a poor final quality.

A third solution consists in adding aluminum metal to the refractory concrete initial formulation. Indeed, aluminum metal hydrolyzes concomitantly with a pH value increase triggered by the hydration of said concrete. This hydrolysis reaction releases hydrogen which, bubbling through the material, creates outlet channels. Such outlet channels are used to drain water away during the drying of the refractory concrete. However this solution presents a non-negligible risk of explosion of the hydrogen released during the implementation of voluminous parts in a confined space.

Therefore, there is a real need for new adjuvants developed for cement compositions and/or for refractory concrete compositions enabling to limit the explosion risks during refractory concrete fast drying, while better preserving the final properties of said refractory concrete formed, especially its compressive strength, its reliability, etc., and this, without affecting its rheology. Indeed, it is desirable that the rheology of the thus formed refractory concrete, especially the handling (consistency) and the workability thereof, be preserved against the addition of a new adjuvant.

The aim of the present invention is thus to provide a new adjuvant for a cement or a refractory concrete composition, in particular a dense refractory concrete, avoiding at least partially the abovementioned drawbacks.

AIM OF THE INVENTION

More particularly, it is provided according to the invention an adjuvant, for example for a composition based on a hydraulic binder, such as a cement composition or a refractory concrete composition, comprising, by weight as compared to its total weight, at least:

(a) from 20% to 70% of at least one aluminum organic acid, (b) from 3% to 20% of at least one deflocculant chosen from a carboxylic acid polymer, a carboxylic acid, a salt thereof, or one of their combinations, and, (c) from 7% to 44% of at least one mineral oxide.

The present invention also relates to a cement composition comprising, by weight, as compared to said cement composition total weight, at least:

from 20% to 70%, preferably from 30% to 60% and most preferably 40% of a hydraulic binder, and from 30% to 80%, preferably from 40% to 70% and most preferably 60% of an adjuvant of the invention, optionally from 0% to 10% of other additives.

Another object of the invention relates to a refractory concrete composition comprising at least, by weight, as compared to the refractory concrete composition total weight, from 1% to 5%, preferably from 2% to 4%, and in particular from 2.5% to 3.5% of a cement composition such as previously defined, and from 95% to 99%, preferably from 96% to 98% and in particular from 96.5% to 97.5% of a granular mixture composed of at least one aggregate and fines.

It is a further object of the present invention to provide the use of an adjuvant such as described hereabove to improve the drying time of a refractory concrete composition or to improve the permeability of a refractory concrete composition.

As used in the present invention, a "concrete" is intended to mean a mixture of hydraulic binder, aggregates, water and optionally adjuvants, as well as additions of other specific additives;

a "hydraulic binder" is intended to mean a material which, mixed with water, hardens under ambient conditions, without addition of any other reactive body, as good in air as in water, and which is capable of agglomerate aggregates between each other; when the hydraulic binder is blended with water and hardens upon contact therewith, it is said to be setting;

a "cement" is intended to mean a hydraulic binder in the form of a powder obtained through the grinding of a clinker and optionally of additives, the clinker being in general, in the context of refractory concrete, formed of hard nodules of calcium aluminate;

an "aggregate" is intended to mean a group of mineral grains of natural and/or synthetic origin with generally a size higher than or equal to 0.1 mm, such as sands, broken gravels, pebbles and gravel-sand mixtures (such as defined in particular in Standard NFP 18-101);

the particle size of sands, aggregates or more generally of a granular mixture component, corresponds to its diameter if such component has a spherical shape; if not, its size corresponds to the length of its primary axis, that is to say the longest straight, which can be drawn between an end of this component and an opposite one thereof;

the particle size of a powder corresponds to the size distribution of its particles;

and according to the invention the "mean particle size" means the Dw50, well known from the skilled person, i.e.: the value of the particle diameter at 50% on the cumulative weight distribution curve.

In the context of the present invention, and unless otherwise specified, values mentioned as ranging from "X to Y" or "comprised between X and Y" are intended to include values X and Y.

According to the invention, all the percentages by weight, unless otherwise specifically indicated, are expressed as compared to the composition dry matter weights (binder, cement or concrete).

DETAILED DESCRIPTION OF AN EMBODIMENT

The description which follows by reference to the appended drawings, given as non-limiting examples, will better explain the content of the present invention and the way it may be implemented.

Figure 4:
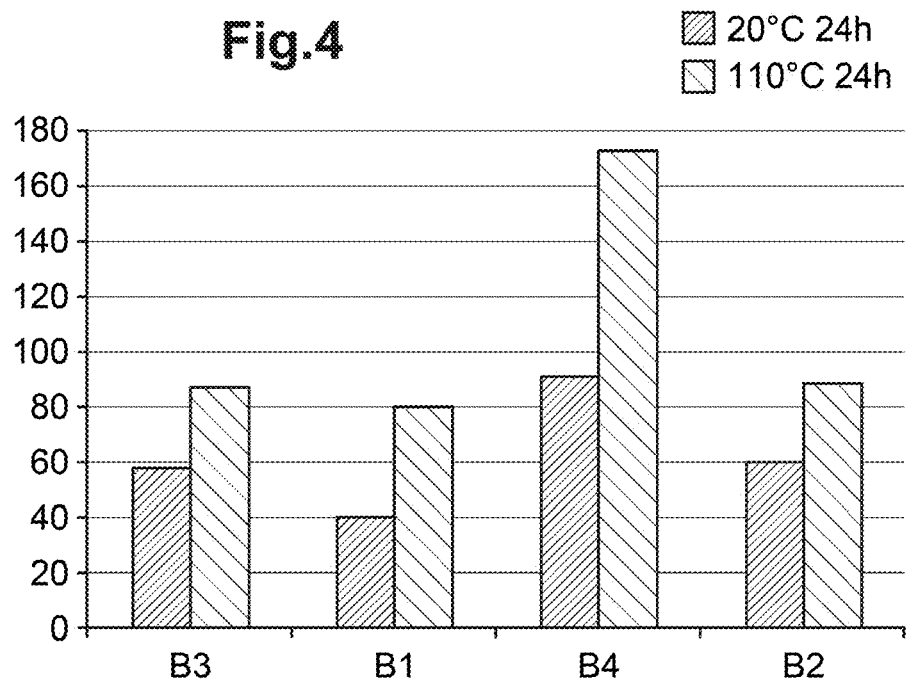
Figure 5:
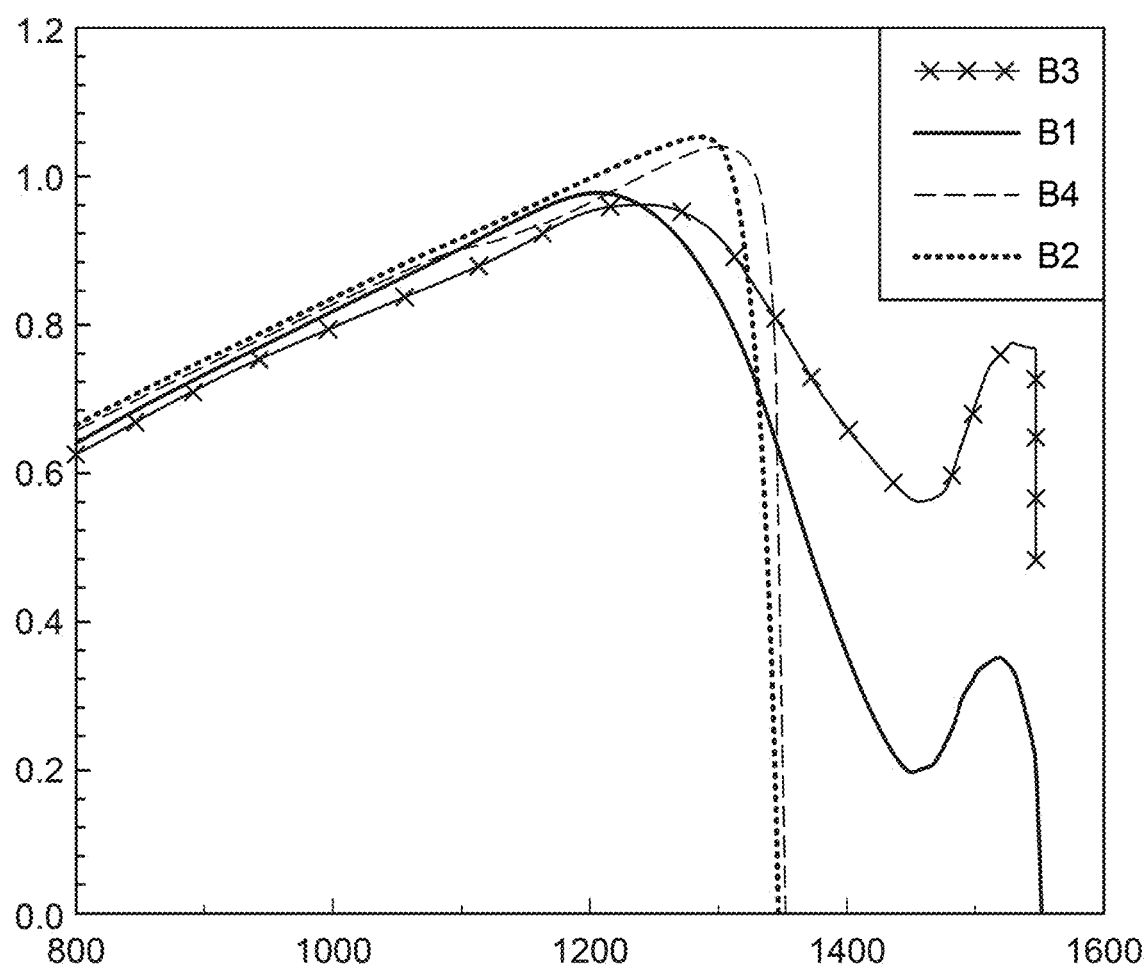

FIG. 4 illustrates the compressive breaking stress after drying, in Megapascal (MPa), of the two refractory concretes of the invention (B1 and B2) and of the two comparative refractory concretes (B3 and B4), these four refractory concretes having been dried according to two different methods of drying (the first method and the second method); and, FIG. 5 is a diagram illustrating the applied load ($\Delta L/\Delta o$) expressed in percentage (%) as a function of the temperature in degrees Celsius (° C.) of the two refractory concretes of the invention (B1 and B2) and of the two comparative refractory concretes (B3 and B4).

The Applicant focused on the development of a new adjuvant for a cement or a refractory concrete composition, such refractory concrete being in particular dense and required to resist to elevated temperatures (1300° C.) and to corrosive atmospheres.

The Applicant demonstrated surprisingly that the combination of three particular components of the invention incorporated as adjuvants to a cement composition could enable to produce a refractory concrete providing a good compromise between, on one hand, a better permeability facilitating water drainage upon drying, and, on the other hand, a satisfactory porosity ensuring a good mechanical resistance.

In addition, the particular component combination of the adjuvant of the invention makes it possible to form a refractory concrete which mechanical properties are correct, even preserved (compressive strength, reliability, etc.), while limiting the explosion risks upon drying.

Moreover, and as will be demonstrated in the experimental section hereafter, the combination of the various components of the adjuvant of the invention has, surprisingly, a synergistic activity enabling to improve the permeability of the refractory concrete as compared to the combination of two components thereof, while preserving in the fresh state (TO) an absolutely satisfying consistency.

For this purpose, it is an object of the present invention to provide an adjuvant for a composition based on a hydraulic binder, such as a cement composition or a refractory concrete composition, comprising, by weight, as compared to its total weight, at least:

(a) from 20% to 70% of at least one aluminum organic acid,
(b) from 3% to 20% of at least one deflocculant, and
(c) from 7% to 44% of at least one mineral oxide.

In particular, such adjuvant preferably comprises:
(a) from 48% to 61% of said aluminum organic acid,
(b) from 5% to 13% of said deflocculant, and
(c) from 19% to 34% of said mineral oxide.

Thus, the (dry) adjuvant of the invention comprises three main components.

The first component is (a) an aluminum organic acid.

According to the invention, an organic acid of said organic acid aluminum may be: monocarboxylic acid, dicarboxylic acid, hydroxy acid, etc., or a mixture thereof.

For example, a convenient monocarboxylic acid may be formic acid, acetic acid, propionic acid, n-butanoic acid, valeric acid, etc., and a convenient dicarboxylic acid may be: oxalic acid, succinic acid, maleic acid, malonic acid, fumaric acid, glutaric acid, etc. and convenient hydroxy acid may be: glycolic acid, lactic acid, tartaric acid, malic acid, citrate, etc.

In particular, glycolic acid, lactic acid, and malic acid are preferred.

Typically, the aluminum organic acid is aluminum lactate.

Especially, aluminum lactate has a lactic acid to alumina weight ratio ranging from 1.0 to 3.0, preferably ranging from 1.2 to 1.6 and is typically 1.4. In other words, the weight for the whole lactic acid functions is from 1.0 to 3.0, preferably from 1.2 to 1.6 times higher than the weight for the whole aluminum ions $Al^{3+}$, these aluminum ions originating from alumina $Al_2O_3$ in aqueous solution.

As an example, an aluminum lactate suitable for the present invention has number CAS 18917-91-4 and may be marketed under identification number M160P by the Taki Chemical Co., Ltd Company. Its lactic acid to alumina $Al_2O_3$ weight ratio is 1.6. The product referred to under identification number Al-lactate 512009001 or 512009002 marketed by the company Dr. Lohmann GmBH may also be suitably used for the present invention.

Without wishing to be bound to any theory, the applicant thinks that the organic acid of the invention enables to improve the permeability of a refractory concrete composition into which it has been incorporated, because of its gelling action that appears upon complexion of the calcium originating from cement, and/or of the magnesium that may originate from the mineral oxide, when this one is for example magnesia or the aggregate used. As will be illustrated hereafter, the action of the organic acid of the invention on permeability will be reinforced by the association with both a deflocculant and a mineral oxide.

The second component is (b) a deflocculant. Advantageously, the deflocculant is chosen from a carboxylic acid polymer, a carboxylic acid, a salt thereof, or one of their combinations.

The carboxylic acid polymer or one of its salts is especially chosen from an acrylic acid polymer, a polyacrylic acid polymer, a methacrylic acid polymer, a salt thereof or one of their combinations.

As an example, (b) the carboxylic acid polymer may be a sodium polyacrylate. In general, a sodium polyacrylate suitable for the present invention preferably has a degree of polymerization between 2 000 and 10 000, preferably between 3 500 and 8 000.

Preferably, (b) the carboxylic acid polymer has a weight average molecular weight between 6 000 and 8 000.

As used herein, the "degree of polymerization" is intended to mean the number of monomer units contained in a macromolecule, that is to say the number of monomer units contained in the polymer chain.

In particular, when the deflocculant (b) comprises a carboxylic acid polymer, this one represents, by weight, as compared to the deflocculant total weight (b) from 0% to 20%, preferably from 3% to 15% and typically from 6% to 12%.

In general, the carboxylic acid may be chosen from citric acid or one of its salts, such as an alkali metal salt, preferably (d) the carboxylic acid is trisodium citrate.

When the deflocculant (b) comprises a carboxylic acid or one of its salts, this one preferably represents, by weight, as compared to the deflocculant total weight (b) from 0% to 20%, preferably from 3% to 15% and typically from 6% to 8%.

The deflocculant of the invention provides a fluidizing effect to the refractory concrete composition to which it is incorporated, insofar as it is able to separate from each other the components of the aggregate and/or to prevent their agglutination to each other.

In addition, the deflocculant forms a complex together with calcium originating from the aluminous cement typically comprised in refractory concrete. The complex formed slows the hydraulic setting down. Thus, advantageously, the refractory concrete may be processed and finished over a relatively long period of time before it hardens. Moreover, thanks to the deflocculant, the final refractory concrete composition comprises a lower amount of water.

Furthermore, when the deflocculant (b) is a carboxylic acid and/or a carboxylic acid polymer, or one salt thereof, such as sodium polyacrylate and/or trisodium citrate, it appeared that this one enables advantageously to improve the rheology of the refractory concrete, in particular by providing it with a good flowability. Moreover, the carboxylic acid or one of its salts enables to use less water in the refractory concrete final composition.

In particular, the sodium citrate combined with the aluminum organic acid, or even with a carboxylic acid polymer and with the mineral oxide, improves the consistency of the concrete by making it less hard.

The third component of the adjuvant of the invention is (c) a mineral oxide or one of its salts, such as a calcium salt or a magnesium salt.

Preferably, (c) the mineral oxide is a metal oxide chosen from a magnesium oxide or a mineral species composed of calcium carbonate and magnesium, such as a dolomite of formula $CaMg(CO_3)_2$ Advantageously, the mineral oxide (c) is magnesium oxide and/or dolomite.

For example, said preferred mineral oxide to be added to the composition of the adjuvant of the invention may come as a powdered magnesium oxide comprising at least 90% by weight of magnesia, and preferably at least 95% of magnesia.

The mineral oxide, and especially magnesia, has preferably a specific surface area BET between 0.5 square meters per gram ($m^2/g$) and 3 $m^2/g$, or more specifically of about 1 $m^2/g$.

A too fine mineral oxide, such as magnesia (with a BET above 3 $m^2/g$) would have negative side effects on rheology, while a too coarse mineral oxide (below 0.5 m²/g) would not have the expected effect on permeability improvement.

According to the invention, a specific surface area BET between 0.5 square meters per gram (m²/g) and 3 m²/g includes the following values and any ranges between those values: 0.5; 0.6; 0.7; 0.8; 0.9; 1.0; 1.1; 1.2; 1.3; 1.4; 1.5; 1.6; 1.7; 1.8; 1.9; 2.0; 2.1; 2.2; 2.3; 2.4; 2.5; 2.6; 2.7; 2.8; 2.9 and 3.0.

As used herein, a "specific surface area BET" is intended to mean the actual surface area of a porous solid, as opposed to its apparent surface area. It is defined as a surface area per unit of mass, also called total mass surface of said porous solid. It is here defined according to the Brunauer, Emmett and Teller method (BET), described in Standard ISO 9277: 1995.

In general, the mineral oxide c) is a metal oxide which has a mean particle size lower than or equal to 0.0063 mm.

As will be demonstrated in the following examples, the combination of the components (a) to (c) of the adjuvant of the invention enables through a synergistic action to improve the permeability of refractory concretes.

The weight percentage of each of the components comprised in the adjuvant of the invention is adjusted empirically so as to reach an acceptable compromise as regards the refractory concrete use characteristics, that is to say, for example, the mechanical characteristics, the resistance to elevated temperatures, the permeability or the workability thereof.

By thus adjusting the weight percentage of each of the adjuvant components, the use characteristics of the refractory concrete get closer to that of known refractory concretes, but the permeability is higher, which facilitates the drying of said refractory concrete of the invention.

Thus, the adjuvant of the invention by improving the permeability of the refractory concrete to which it is incorporated, facilitates the water drainage during its drying, which limits at least partially for the refractory concrete an explosion hazard during a quick drying.

Moreover, the adjuvant of the invention enables to preserve most of the refractory concrete mechanical resistance properties.

Thanks to the adjuvant of the invention, the refractory concrete has good use characteristics, such as workability and handling. Indeed, it is not necessary to add water more than appropriate to improve the rheology of the adjuvant-containing concrete. Such supplement of water addition would increase the concrete porosity and could therefore affect the mechanical properties thereof.

Further, thanks to the preferred adjuvant of the invention, formability and castability of the refractory concrete are made easier.

Such as mentioned hereabove, the adjuvant of the invention is particularly suitable to formulate refractory concretes based on cement, such as of aluminous cement.

The present invention further relates to a cement composition (in the dry state) comprising, by weight, as compared to said cement composition total weight, at least:
  from 20% to 70%, preferably from 30% to 60% and most preferably 40% of a hydraulic binder, and
  from 30% to 80%, preferably from 40% to 70% and most preferably 60% of an adjuvant of the invention such as described hereabove,
  optionally from 0% to 10%, preferably from 0.2% to 5% of other cement additives (which will be described hereunder).

In particular, the hydraulic binder comprises, by weight, as compared to its total weight at least 65%, preferably from 70% to 99%, typically from 80% to 95% of calcium aluminate.

As used herein, "at least 65% by weight of calcium aluminate" includes the following values in percentages: 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5, or 99.9.

As a rule, said calcium aluminate comprises mineral oxides as traces, especially it comprises less than 10%, preferably less than 8% and especially less than 5% by weight of mineral oxides as traces, as compared to its total weight. These oxides are for example $SiO_2$, $Fe_2O_3$, $TiO_2$, $K_2O$, $Na_2O$, etc.

Typically, the hydraulic binder suitable for use in the invention comprises the following mineralogic phases (abbreviation relative to cement C=CaO and A=$Al_2O_3$): CA, $CA_2$, A, $C_{12}A_7$ or one of their combinations.

As an example, it may have following chemical composition, expressed by weight as compared to said hydraulic binder total weight:
  from 40% to 85% $Al_2O_3$;
  from 15% to 40% CaO;
  from 0.2% to 8% $SiO_2$;
  from 0.1% to 10% $Fe_2O_3$;
  other mineral oxides as traces.

Commercial products marketed by the KERNEOS company under the trade names Secar®71 or Secar®80. Secar®51 or CMA72 can be suitably used as hydraulic binders in the present invention.

The cement composition according to the invention is obtained by dry mixing together the various components.

Indeed, the cement composition is prepared according to following step: the adjuvant of the invention is combined with the hydraulic binder such as previously defined and optionally with cement additives for a time ranging from 10 seconds to 10 minutes, in particular from 2 to 5 minutes in a blender, such as a mixer with a rotation speed ranging from 120 to 230 rpm, in particular from 130 to 190 rpm.

At the outlet of the device, a cement having been "additived" is obtained, that is to say a powder forming a new hydraulic binder.

This cement composition enables especially to prepare a refractory concrete composition, such as a dense refractory concrete composition.

Thus, the present invention further relates to a refractory concrete composition comprising at least, by weight as compared to the refractory concrete composition total weight in the dry state, especially non combined with water,
  from 1% to 5%, preferably from 2% to 4% and in particular from 2.5% to 3.5% of a cement composition such as previously defined, and
  from 95% to 99%, preferably from 96% to 98% and in particular from 96.5% to 97.5% of a granular mixture composed of at least one aggregate and fines,
  from 0% to 10%, preferably from 2 to 8% of additives for concrete.

Preferably, the granular mixture comprises, by weight, as compared to its total weight, from 70% to 95% of the aggregate and from 5% to 30% of fines.

Thus, in general, for 100 parts by weight of a mixture comprising a cement composition and one aggregate such as previously defined, the refractory concrete of the invention comprises:
  (a) from 0.34 to 2 parts by weight, preferably from 0.7 to 1.5, typically from 0.81 to 1.03 parts by weight, and most preferably 1 part by weight of said at least one aluminum organic acid, such as aluminum lactate;

(b) from 0.08 to 0.34 parts by weight, preferably from 0.10 to 0.34, for ex. 0.2 parts by weight of at least one deflocculant, such as sodium polyacrylate and/or trisodium citrate;

(c) from 0.11 to 0.74 parts by weight, preferably from 0.32 to 0.54 parts by weight, for ex. 0.5 parts by weight of said at least one mineral oxide, such as magnesia.

As an example, the aggregate of the invention may be composed of refractory aggregates or insulating aggregates, which especially resist to elevated temperatures, ranging for example from 300° C. to 1800° C., typically up to 1300° C., and at least to 1000° C.

According to the invention, the aggregate used herein is an independent component of mineral oxide, such as magnesium oxide that may be present in the adjuvant. Therefore, the weight content of magnesium oxide comprised in the adjuvant is different from the weight content of the mineral oxide, such as magnesia, comprised in the aggregate of the refractory concrete composition according to the invention.

In general, aggregates have a particle size lower than 30 millimeters (mm), preferably they have a particle size distribution ranging from 0 to 10 millimeters (mm). Following granular fractions are suitable examples: 0/0.5 mm, 0.25/8 mm, 0.5/1 mm, 3/6 mm, 6/14 mesh (i.e. 3.3/1.4 mm), 14/28 mesh (i.e. 1.4/0.6 mm), 28/48 mesh (i.e. 0.6/0.3 mm), higher than 48 mesh (i.e. lower than 0.3 mm). The choice between these various aggregates depends amongst others on the thickness of the refractory component to be built.

Typically, the raw materials in refractory aggregates are unstable to curing and for this reason they are advantageously made stable through pre-firing treatment, which generally makes it also possible to bring the aggregate porosity back to the desired degree.

Thus, the aggregate of the invention is preferably chosen from an aggregate obtained through calcination. Such an aggregate obtained through calcination for use in the present invention may be chosen from dolomite, magnesia, alumina silicates, tabular alumina, calcined bauxites, or fused alumina, synthetic mullite, synthetic spinels or one of their combinations.

For example, dolomite is prepared from of a double carbonate of lime and of magnesia calcined at a high temperature (1800/1900° C.) so as to obtain porosity levels lower than 5% and to stabilize dolomite. The magnesia-based aggregate may be obtained by means of two distinct methods: either through the giobertite calcination at a high temperature, or through the precipitation, thereafter the calcination of sea-water magnesium salts. Synthetic mullites may be in turn obtained through the fusion of bauxite and silica or alumina and silica, or as another alternative, they may be obtained by sintering a mixture of clay, kaolin and alumina. These aggregates obtained through calcination are traditional and well known from the person skilled in the art.

However, some types of aggregates suitably used in the present invention and having a high resistance to elevated temperatures are not obtained through calcination. These types of aggregates correspond in particular to alumina silicates. To be mentioned as a suitable example, andalusite (or Kerphalite), which is an alumina silicate present in metamorphic rocks in the form of white cristals, can be suitably used as an aggregate in the frame of the present invention.

According to one embodiment of the invention, the aggregate does not comprise dolomite and/or magnesia. The aggregates may therefore comprise alumina silicates, tabular alumina, calcined bauxites, fused alumina, synthetic mullite, spinel or a mixture thereof.

According to another embodiment, the aggregate comprise dolomite and/or magnesia. When they are present, they represent preferably, by weight, relative to the total weight less than or equal to 50% of the aggregates, especially less than or equal to 40% and typically less than or equal to 30% of the aggregates, and may be ranging from 1 to 30%, preferably from 3 to 10% of the aggregates.

According to a characteristic of the invention, the dolomite and/or the magnesia or the other oxide minerals which may compose the aggregates have a specific surface area BET which is lower than 0.5 m$^2$/g (<0.5 m$^2$/g).

According to another characteristic of the invention, the dolomite and/or the magnesia or the other oxide minerals which may compose the aggregates may comprise, by weight, relative to their total weight: less than 30%, preferably less than or equal to 20%, in particular less than or equal to 10%, and typically less than or equal to 5%, such as 3% or 2%, of particles having a dimension (length of the major axis) less than 0.0063 mm. The other particles of the dolomite and/or the magnesia or the other oxide minerals which may compose the aggregates have a particle size selected from: 0.25/8 mm, 0.5/1 mm, 3/6 mm, 6/14 mesh, 14/28 mesh (i.e. 1.4/0.6 mm) or a mixture thereof.

The refractory concrete composition or the cement composition of the invention may comprise other additives, different from the adjuvant of the invention such as previously defined.

These other additives may be air-entraining agents, incorporated in small amounts so as to modify, improve or complete some of the characteristics of the finished and dry concrete.

To be also mentioned as suitable examples are those additives, which do influence the setting time and the hardening time, such as especially accelerators, which shorten the time period between the hydration of the binders and their setting, and retarders, which extend the time period between hydration of binder particles and the initial set thereof. To be mentioned as suitable accelerators are for example lithium salts such as carbonate, calcium or sodium chlorides, some alkalis (soda, potash, ammonia) or salts thereof (potash or soda sulfate). To be mentioned as suitable retarders are for example carbohydrates (sugars, glucose, starch and cellulose), various acids or acid salts, or alkali phosphates (such as sodium tripolyphosphate).

To be further mentioned are additives influencing plasticity and compactness, such as plasticizers and fluidizing agents, which are known for being water-reducing agents. To be incorporated as a suitable plasticizer is for example bentonite, fat lime, ground limestone, fly ash and diatomite. Polyacrylates, polycarboxylates, alkali phosphates, lignosulfates, resin soaps or synthetic detergents can be suitably used as fluidizing agents.

The refractory concrete dry composition is prepared according to a traditional method known from the person skilled in the art, especially by mixing together the various components of the concrete, especially the cement composition defined hereabove (and thus comprising the additive of the invention) with the aggregate and optionally the other additives (different from the additive of the invention) in a blender provided to that end.

Such concrete dry composition is then combined with water, so as to obtain a fresh concrete composition which comprises especially following successive steps:

the refractory concrete dry composition defined hereabove is introduced into a blender, such as a mixer, mixing water is added to the concrete dry composition and mixing is carried out for 2 to 10 minutes at a rotation speed between 130 and 150 rotations per minute, preferably of 140 rotations per minute.

Here, the water mix rate, especially the water amount as compared to the concrete composition dry weight, typically ranges from 2% to 10%, preferably from 3% to 8%, most preferably from 5% to 8%.

In the context of the present invention, mixing water also includes the possible water content of the various aggregates.

Once the concrete composition has been combined with water, a cement paste is obtained, which can be thereafter sprayed or cast so as to make a work or a building element, which will be particularly resistant to very elevated temperatures. In particular, the refractory concrete will be suitably used in the industrial sector providing internal coatings for furnaces, blast furnaces, boilers, ducts, stacks, incinerators, etc.

Lastly, the present invention also relates to the use of the adjuvant of the invention to improve the drying time of a refractory concrete composition and/or to improve the permeability of a refractory concrete composition.

The present invention will be now illustrated by means of the following examples. Unless otherwise specified, the percentages are expressed in weight percent.

EXAMPLES

A) Test Procedures

Figure 1:
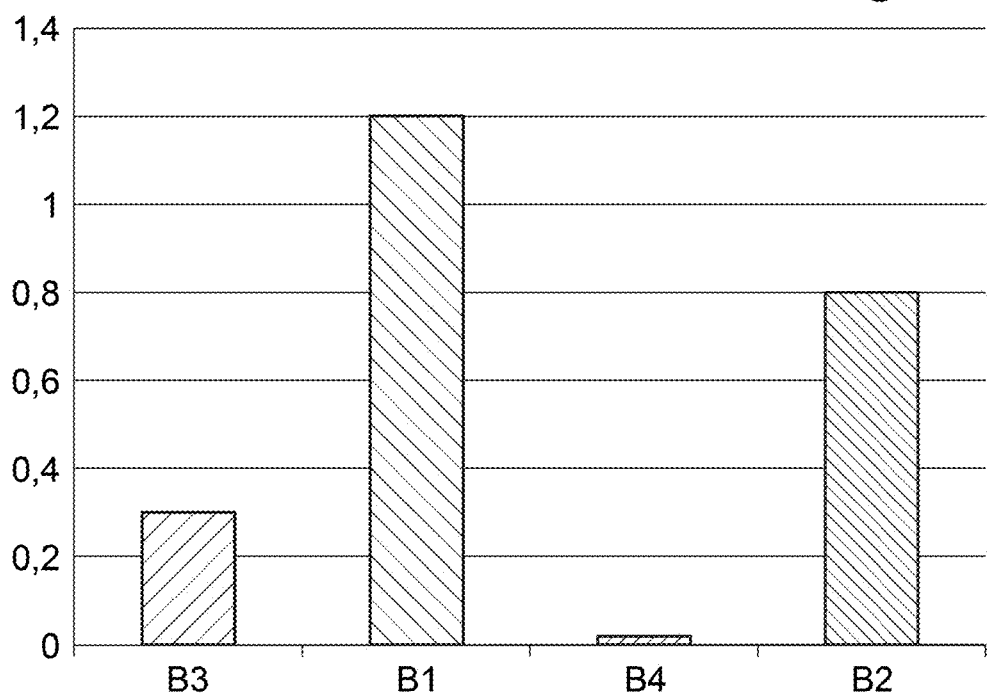
FIG. 1 illustrates the permeability in millidarcy (mD) of two refractory concretes (B1 and B2) comprising an adjuvant of the invention and of two comparative refractory concretes (B3 and B4)

The following test procedures have been carried out to evaluate the characteristics of the various tested compositions:

1. Test Method for Air Permeability (FIG. 1)

The air permeability measurement is based on the evaluation of the ability for a porous material to be traversed, via its pores, by gases or other fluids.

Air permeability is expressed in millidarcy (mD), one darcy corresponding to the permeability of a continuous and isotropic body through which a fluid is flowing, which viscosity is close to that of water at 20° C., at a speed of 1 centimeter per second (cm/s) when it is submitted to a pressure of 1 atmosphere (atm).

The determination of the permeability of the refractory concretes of the following examples is effected at room temperature of 20° C.+/−2° C. with 70%+/−10% of moisture. The concrete sample is prepared, then placed in a Teflon® mold shaped as a disk of 100 mm diameter and 25 mm thickness on a vibrating table Sinex with frequency 50 Hz and amplitude 0.3 mm according to the following protocol providing 3 vibrations:

the mold is filled up to 50%, the vibration lasts 30 s;
the mold is filled up to 100%, the vibration lasts 30 s;
30 s additional vibration.

The sample is then placed to cure into a wet chamber (20° C., 95% of residual moisture) for around 24 hours. Thereafter it is removed from its mold and disposed in a drying oven at 110° C.+/−2° C. for at least 24 hours.

Once cooled down, the thickness and the diameter are measured with an accuracy to a thousandth of an inch (which corresponds to 2.54 cm) and the sample is placed into a permeameter VacuPerm® based on vacuum drop measurement (pressure in the beginning of the cycle is lower than 0.1 atm so as to enable the vacuum acquisition; when it reaches 0.75 atm, the permeability measurement stops). A software displays the result, as well as the standard deviation, which must be kept under 10% of the result.

Figure 2:
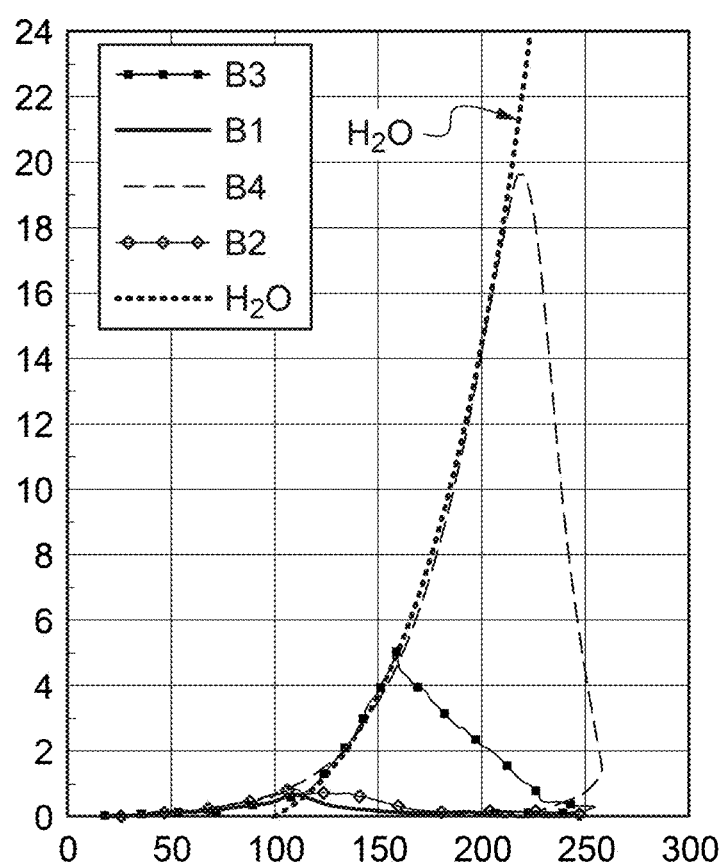
FIG. 2 illustrates the evolution of the internal pressure in bars as a function of the temperature in degrees Celsius (° C.) of the two refractory concretes of the invention (B1 and B2) and of the two comparative refractory concretes (B3 and B4)

2. Measurement of the Steam Pressure In Situ During the Heating Process (FIG. 2)

This test consists in placing the 300×300×100 mm test sample under a radiant heating (5000 W) so as to obtain, after 3 minutes, a temperature of 600° C. The side faces of the sample are then thermally insulated with porous ceramics bricks. Moreover, the sample during the molding is fitted with temperature and pressure gauges in the form of circular plates (Ø12×1 mm) in a sintered metal, which are located within the test sample thickness. Each plate is welded to a metal tubing having a diameter lower than 2.6 mm, which starts from the cold face of the sample (opposite to the face close to the radiant heating) to a pressure sensor. For temperature measurements, a few thermocouples (Ø1.5 mm) are inserted into the metal tubing. A first gauge is especially placed 2 mm away from the heated face (temperature measurement), and five additional pressure and temperature gauges are successively placed 10, 20, 40, 60 and 80 mm away from the heated face within a square of 10×10 cm$^2$. The weight loss during the heating process may be recorded via a weighing device onto which the sample is placed.

The steam pressure in situ depends on the temperature. Thus, maximum pressure will be reached immediately before the end of drying, especially when the temperature reaches its peak value.

Figure 3:
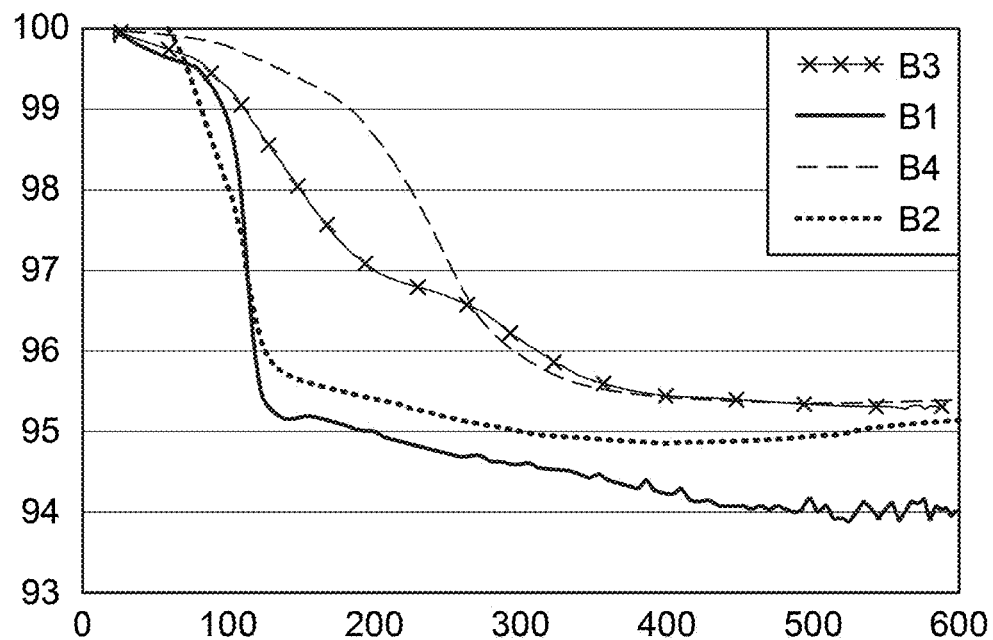
FIG. 3 shows the weight loss in percentage (%) as a function of the temperature in degrees Celsius (° C.) of the two refractory concretes of the invention (B1 and B2) and of the two comparative refractory concretes (B3 and B4) measured by thermogravimetric analysis (TGA)

3. Measurement of the Thermogravimetric Analysis (TGA) (FIG. 3)

TGA is a thermal analysis method which consists in measuring the weight variation of a sample as a function of time, for a given temperature or temperature profile (here, during the drying of the test concrete sample).

The procedure to perform this test consists in preparing and casting a fresh sample under vibration in a metal mold shaped as a cube of 10×10×10 cm. A first temperature sensor is placed into the sample 1 cm away from the edge and a thermocouple wire is placed about 5 cm deep in the center so as to measure the internal temperature of the sample. After the positioning, the sample undergoes a cure at 20° C. with 100% of residual moisture for 24 hours. The sample is then removed from the mold, placed into an oven and hung up in a combustion boat attached to a weighing device. The tracking, as a function of the weight loss and of the internal temperature of the sample, uses a temperature rise instruction controlled by the oven of 5° C./min up to 600° C. with a 2 h-hold at this temperature.

Thanks to these analyzes, the temperature ranges can be determined, within which water is removed from the refractory concretes, these temperature ranges corresponding to the ranges within which the weight of said refractory concretes falls.

4. Test Method for Compressive Strength (Standard NF in 12390-4) (FIG. 4)

The principle of this test method consists in submitting a cylindrical specimen to an increasing and continual strength until the specimen breaks, so as to determine the compressive strength.

The procedure to perform this test consists in preparing and casting a fresh concrete sample under vibration in a stainless mold of 160×30×30 mm.

After positioning, the sample undergoes a cure at 20° C. with 100% of residual moisture for 24 hours.

Optionally, the sample moreover may be placed into an oven at 110° C.+/−2° C. for at least 24 hours after the cure step at 20° C.

Once the test sample has been removed from the mold, the mechanical performance measurements are effected at the time periods desired on at least two flexural test prisms, providing compressions on minimum 4 half-prisms (Ibertest press). Compressive strength ranges from 0 to 200 kN and flexural strength from 0 to 10 kN.

5. Refractory Character Under Load (FIG. 5) According to Standard 1501893/EN993-8

This test enables to study the behaviour of the refractory concrete samples in thermal conditions that can reach as high as 1650° C.

For such a test, the sample comes as a specimen (external diameter=50 mm, height=50 mm) perforated in the center (hole ∅=5 mm).

The equipment comprises an oven fitted with a regulation system, thermocouples to control temperature and a device to apply onto the specimen an axial load and measure the height variation. A data acquisition system enables to record all the data outgoing from the device.

B) Characterization of Refractory Concrete Compositions of the Invention

1. Compositions Tested a) Examples of Adjuvant Compositions

Various adjuvant compositions of the invention have been prepared.

The method for preparing such adjuvant compositions comprises the following step: aluminum lactate $C_9H_{15}AlO_9$ (Cas-Nr 18917-91-4) is combined with sodium polyacrylate having an average molecular weight in weight (Mw) between 6000 and 8000, together with magnesia MgO and/or citric acid for 4 minutes at room temperature in a Lödige M20 blender. The speed of rotation of the drive shaft is set to 190 rpm and the clod breaker speed is set to 1500 rpm.

The adjuvant compositions Ex. 1, Ex. 2 and Ex. 3 of the invention are given in Table 1 hereunder:

TABLE 1

| Composition | Ex.1 (%) | Ex.2 (%) | Ex.3 (%) |
|---|---|---|---|
| Aluminum lactate | 58.82 | 57.1 | 62.50 |
| Sodium polyacrylate | 11.76 | 11.4 | — |
| Magnesia | 29.42 | 28.6 | 31.25 |
| Trisodium citrate | — | 2.9 | 6.25 | b) Examples of Cement Compositions

Starting from the adjuvant composition Ex. 1 of the invention, a cement composition of the invention (F1) has been prepared. For comparative purposes, two cement compositions according to the prior art (F2, F3) have also been prepared according to the same procedure, except that comparative cement composition F2 comprises a known fluidizing agent, Peramin Al200®, based on polycarboxylate ether (PCE), which is marketed by the KERNEOS company, and that composition F3 comprises sodium tripolyphosphate (Na-TPP) having a molecular weight of 368 g/mol.

For this test, the cement compositions have been prepared by mixing the product Secar71® (which chemical composition comprises by weight from 67.5% to 70.5% $Al_2O_3$, from 28.5% to 31.5% CaO, $SiO_2$ and $Fe_2O_3$ as traces) together with the adjuvant in the blender Lödige M20; the speed of rotation of the drive shaft is set to 190 rpm and the clod breaker speed is set to 1500 rpm.

The tested cement compositions F1, F2 and F3 have the following formulations (Table 2):

TABLE 2

| Formulation | | F1 (%) | F2 (%) | F3 (%) |
|---|---|---|---|---|
| Hydraulic binder | Secar71 ® | 50 | 96.67 | 99 |
| Adjuvant | Ex.1 | 50 | — | — |
| | Al200 | — | 3.33 | — |
| | Na-TPP | — | — | 1 | c) Examples of Concrete Compositions

Two refractory concrete compositions of the invention B1 and B2 have been prepared in a blender Perrier starting from the previous cement composition of the invention F1: the one with a low content in cement (B1) and the other with an intermediate content in cement (B2).

Two comparative compositions of refractory concrete B3 with a low content in cement and B4 with a medium content in cement have also been prepared, respectively from the comparative cement compositions F2 and F3 described hereabove.

The tested concrete compositions B1, B2, B3 and B4 are given in Table 3 hereunder (formulations F1 to F3 are those of Table 2).

TABLE 3

| | Low content in cement (LCC) (%) | | Medium content in cement (MCC) (%) | |
|---|---|---|---|---|
| Compositions | B1 | B3 | B2 | B4 |
| Tabular alumina | 70 | 70 | 80 | 80 |
| Spinel | 15 | 15 | 5 | 5 |
| Reactive alumina | 9 | 9 | 5 | 5 |
| Binder: Secar ®71 | 3 | 3 | 7 | 7 |
| F1 | 3 | | 3 | |
| F2 | | 3 | | |
| F3 | | | | 3 |
| Mixing rate with water (%) | 5.2 | | 5.3 | |

The refractory concretes B1 to B4 have been prepared according to the following procedure (Standards CEN 196.1 and 1402-4):
   raw materials (cement compositions F1, F2, and F3, aggregate, etc.) and water are first conditioned at least 24 hours at the temperature setpoint of 20° C.+/−2° C. (formulations F1, F2 and F3 are in particular stored in a dry and tight container);
   the water amount required for the mixing is determined and weighted;
   the mixer Perrier (5 L tank) is set on low speed at 140+/−5 rpm as for rotation and 62+−/6 rpm as for the planetary movement;
   2 kg of the cement formulations to study are introduced into a bowl, which walls are perfectly dry;
   the whole mixing water is incorporated therein within 5 s maximum;
   the paste is mixed for 2 min,
   within 30 s the walls of the bowl are scraped to detach the dry matter;
   the paste is mixed again for 2 additional min.

The refractory concretes of the invention and those according to the prior art are then dried according to, either a first drying method, or a second drying method, depending on the tests carried out.

The first drying method consists in leaving the concrete dry at room temperature, that is to say at 20 degrees Celsius (° C.) for 24 hours.

The second drying method consists in adding an additional step of drying as compared to the first method, especially in heating the concrete at 110° C. for 24 hours.

Such as mentioned hereabove in Paragraph (A), samples are dried according to Method 1 or Method 2 depending on the tests performed. For example, for the test method for the compressive strength (FIG. 4), two sets of concretes B1 to B4 have been prepared: a set produced with the first drying method and a second set obtained with the second drying method.

2. Results (FIGS. 1 to 5)

a) Permeability (FIG. 1)

On FIG. 1, the permeability of refractory concretes B1 and B2 of the invention was compared to that of comparative refractory concretes B3 and B4.

As shown on FIG. 1, concretes B1 and B2 comprising the adjuvant of the invention (Ex. 1) have a better permeability. Thus, the adjuvant of the invention (Ex. 1) markedly improves the permeability of refractory concretes studied.

Indeed, the refractory concrete B1 of the invention, that is to say the refractory concrete with a low content in cement F1 comprising adjuvant Ex. 1 of the invention, has a permeability approx. 300 times higher than comparative refractory concrete B3 with the same composition. Likewise, refractory concrete B2 of the invention, especially the refractory concrete with a medium content in cement F1 comprising adjuvant Ex. 1 of the invention, has a permeability more than 1000 times higher than comparative refractory concrete B4 with the same composition.

These results are confirmed by measurements of the internal pressure in various points within the previously mentioned refractory concretes B1, B2, B3 and B4, during an increase in temperature. The test consists especially in measuring, by means of suitable sensors, the steam pressure and the temperature in various points within refractory concrete samples B1 to B4 upon unidirectional heating of said samples.

b) Steam Pressure In Situ as a Function of Temperature (FIG. 2)

FIG. 2 illustrates the results of this test method for measuring the pressure for refractory concretes B1 and B2 of the invention, and for comparative refractory concretes B3 and B4. It can be especially observed on this FIG. 2 that the internal pressure of refractory concretes B1 and B2 enriched with the adjuvant of the invention (Ex. 1) does not go over 1 bar, whereas the internal pressure of comparative refractory concretes B3 and B4 reaches 5 bars, even is higher than 19 bars.

These results demonstrate that water is more easily drained away from refractory concretes B1 and B2 of the invention, which confirms that the permeability of said refractory concretes B1 and B2 of the invention is improved as compared to that of comparative refractory concretes B3 and B4 of the prior art.

Thus, this test shows that the adjuvant of the invention is able to drastically limit explosion hazards regarding the refractory concretes of the invention during the drying thereof.

c) Weight Loss as a Function of Temperature (TGA Measure) (FIG. 3)

As demonstrated hereabove, the permeability is improved. Therefore, the drying of the refractory concretes of the invention is also improved.

On FIG. 3, it can be observed that the temperature range within which water is drained off from the two refractory concretes B1 and B2 of the invention, extends from 100° C. to 150° C. approx. Such a temperature range is narrower and ends at lower temperatures than the temperature range within which water is drained off from comparative refractory concretes B3 and B4, which, as for it, ends between 100° C. and 350° C. approx.

Thus, thanks to adjuvant Ex. 1 of the invention, the drying of refractory concretes B1 and B2 of the invention is markedly improved, since it is not required to increase temperature to complete said drying.

These results do coincide with those of the pressure test (FIG. 2). Indeed, curves on FIG. 2 show the maximum internal pressures within the material, for which maximum internal pressures are achieved just before the end of drying (steam pressure as a function of temperature).

Thus, internal pressure maximum level in refractory concretes B1 and B2 of the invention is at a temperature of about 105° C. approx., whereas for comparative refractory concrete B3, internal pressure maximum level is around 160° C. approx., and for comparative refractory concrete B4, internal pressure maximum level is around 220° C. approx.

d) Compressive Strength (FIG. 4)

To control that the improved permeability does not impair the mechanical properties, and especially the mechanical resistance of refractory concretes B1 and B2 of the invention, the mechanical compressive strength of refractory concretes B1 and B2 of the invention has been compared to that of comparative refractory concretes B3 and B4 of the prior art.

As shown on FIG. 4, refractory concrete B1 of the invention has a mechanical compressive strength similar to that of comparative refractory concrete B3, especially when these concretes have been dried according to the second drying method.

The mechanical compressive strength of refractory concrete B2 of the invention is reduced by half as compared to that of comparative refractory concrete B4. However, the mechanical compressive strength of refractory concrete B2 of the invention remains fully satisfying, and it is of the same order of magnitude as that of refractory concrete B1 of the invention and of comparative refractory concrete B3.

e) Refractory Character Under Load (FIG. 5)

Also compared was the refractory character under load of refractory concretes B1 and B2 of the invention relative to that of comparative refractory concretes B3 and B4.

To that end, an experiment was conducted on refractory concretes B1 to B4 so as to evaluate their refractory character under load. The results of such comparison are given on FIG. 5. Thus, it can be observed that the refractory behaviour under load for refractory concretes B1 and B2 of the invention is very similar to that of comparative refractory concretes B3 and B4 of the prior art.

f) Conclusion

Thus, refractory concretes B1 and B2 comprising adjuvant Ex. 1 of the invention have a better permeability than comparative refractory concretes B3 and B4 of the prior art. Moreover, refractory concretes B1 and B2 comprising adjuvant Ex. 1 of the invention have mechanical resistance properties that are at least partially similar to that of comparative refractory concretes B3 and B4 of the prior art.

Therefore, adjuvant Ex. 1 of the invention contributes to the improved drying of the refractory concretes of the invention, especially by reducing the explosion hazard during the drying thereof, without impairing the refractory qualities of said refractory concretes of the invention.

C) Characterization of the Adjuvant and of the Cement Compositions of the Invention The test hereafter aims at demonstrating the synergistic activity of the components of the adjuvant of the invention when taken as a combination.

1. Tested MCC Concrete Compositions

For this test, various formulations of adjuvants have been tested to prepare refractory concretes. The "basic composition" of the tested refractory concretes, especially the mix composed of cement and aggregate, is given in Table 4; whereas the final compositions of the tested concretes (called hereunder B5 to B15 and B19-B21) are given in Table 5. Examples B11, B12, B14 and B15 are according to the invention. The other examples are comparative examples.

The adjuvant, cement and concrete compositions have been prepared from the same raw materials and according to the same procedure as described in previous Test (B) according to a first drying method ("24 h air dry") or to a second drying method ("24 hours 110° C.").

TABLE 4

| Components | Basic MCC concrete (%) |
|---|---|
| Tabular alumina 1/4-8 mm | 35.0 |
| Tabular alumina 6-14 mesh (i.e. 3.4-1.4 mm) | 15.0 |
| Tabular alumina 14-28 mesh (i.e. 1.4-0.6 mm) | 8 |
| Tabular alumina 28-48 mesh (i.e. 0.6-0.3 mm) | 9 |
| Tabular alumina <48 mesh (i.e. <0.3 mm) | 7 |
| Tabular alumina −325 mesh (i.e. ~0.044 mm) | 6 |
| Reactive alumina | 5 |
| Fumed silica | 5 |
| Secar ® 71 | 10.0 |
| Total | 100 |

For 100 parts by weight of basic concrete depending on basic composition given in Table 4 hereabove, various adjuvant compositions have been studied (Table 5):

The mixing rate with water for all concretes B5 to B15 and B19 to B21 tested is 5.50%.

Table 5 shows that the concrete comprising the adjuvant of the invention has a better permeability, while having a fully satisfying rheology (flow test in the fresh state determined with Abrams cone).

Indeed, the permeability of a reference concrete B5 not comprising any adjuvant except a retarder (sodium tripolyphosphate) has a permeability of 0.05 mD for a consistency of 210 mm. For an essentially similar consistency, the concretes prepared with the adjuvant of the invention have a permeability increased by 26 (for example if comparing concretes B11 or B14 of the invention and reference concrete B5), even by 30 if comparing concrete B15 of the invention and reference concrete B5.

This Table also shows that the concrete only comprising aluminum lactate (concrete B6) has a low permeability of 0.20 mD.

Concretes B9, B13, B19, B20 and B21 show the effect on permeability of addition of several types of deflocculant to the adjuvant composition comprising only aluminium lactate. It appears that sodium tri-polyphosphate (Na-TPP) and Sodium Hexameta Phosphate (Na-HMP) show a similar and limited increase (respectively 0.36 and 0.40 mD), while the deflocculant according to the invention, citric acid, citrate and polyacrylate, shows better permeability improvements (respectively: 0.48, 0.80 and even 1.09 mD).

When magnesia is added to a concrete only comprising aluminium lactate (concrete B8), permeability reaches 0.59 mD, i.e. increase in permeability by a factor 3 and when sodium polyacrylate is additionally added (concrete B11), permeability reaches 1.3 mD, i.e. increase in permeability by 6.5 as compared to concrete B6.

Further, the permeability of a concrete comprising the adjuvant of the invention based on trisodium citrate is highly

TABLE 5

| Tested concretes | B5 | B6 | B7 | B8 | B9 | B10 | B11 | B12 | B13 | B14 | B15 | B19 | B20 | B21 |
|---|---|---|---|---|---|---|---|---|---|---|---|---|---|---|
| Al Lactate | 0 | 1.0 | 0 | 1.0 | 1.0 | 1.0 | 1.0 | 1.0 | 1.0 | 1.0 | 1.0 | 1.0 | 1.0 | 1.0 |
| Sodium polyacrylate | 0 | 0 | 0.2 | 0 | 0.2 | 0.2 | 0.2 | 0.2 | 0 | 0 | 0.2 | — | — | — |
| Trisodium citrate | 0 | 0 | 0 | 0 | 0 | 0 | 0 | 0 | 0.1 | 0.1 | 0.05 | — | — | — |
| Magnesia | 0 | 0 | 0 | 0.5 | 0 | 0 | 0.5 | 0.5 | 0 | 0.5 | 0.5 | — | — | 0.1 |
| Sodium tripolyphosphate* | 0.03 | 0 | 0 | 0.03 | 0 | 0.03 | 0 | 0.03 | 0 | 0 | 0 | 0.03 | — | — |
| Na-HMP** | — | — | — | — | — | — | — | — | — | — | — | — | 0.03 | — |
| RESULTS | | | | | | | | | | | | | | |
| Permeability (mD) 110° C. | 0.05 | 0.20 | 0.32 | 0.59 | 1.09 | 0.73 | 1.30 | 1.21 | 0.48 | 1.3 | 1.48 | 0.36 | 0.40 | 0.80 |
| Consistency (initial T0) | 210 | 220 | 230 | 215 | 205 | 195 | 190 | 195 | 225 | 215 | 180 | 225 | 230 | 210 |
| Mechanical resistance (MPa) | | | | | | | | | | | | | | |
| Air drying 24 h | 9.1 | 8.8 | — | 8.8 | 7.8 | 7.9 | 8.7 | 8.2 | — | — | — | — | — | — |
| 110° C. | 18.0 | 14.5 | — | 8.1 | 9.2 | 10.0 | 7.7 | 6.9 | — | — | — | — | — | — |
| Air drying 24 h | 90.0 | 64.2 | — | 62.1 | 52.0 | 53.5 | 59.9 | 57.3 | — | — | — | — | — | — |
| 110° C. | 165.0 | 155 | — | 100.7 | 97.8 | 115.8 | 84.6 | 92.0 | — | — | — | — | — | — |

*molecular weight = 368 g/mol
**Sodium Hexa Meta Phosphate increased as compared to reference concrete or as compared to concrete compositions only comprising one or two of the main components of the adjuvant of the invention, such as compositions B6 to B10 and B13, while having an acceptable rheology. For example, permeability is increased by 6 if comparing concrete B14 of the invention and concrete B6 only comprising aluminum lactate, or by 2.7 if comparing the same concrete B14 of the invention and concrete B13 (aluminum lactate+trisodium citrate), which corresponds to a variation of +171%.

Therefore, the combination of the three components of the adjuvant enables to significantly improve the permeability of a refractory concrete to which they are incorporated as compared to the use of only one or two of these components.

Moreover it can be observed from this Table 5, that incorporating a retarder (sodium tripolyphosphate) into the adjuvant results in a very slight decrease in permeability (concrete B12).

2. Tested LCC Concrete Compositions

For this test, various formulations of adjuvants have been tested so as to prepare refractory concretes. The "basic composition" of the tested concretes, especially the mix composed of cement and aggregate, is given in Table 6; whereas the final compositions of the tested concretes (called hereunder B16 to B18) are given in Table 7. For this test again the adjuvant, cement and concrete compositions have been prepared from the same raw materials and according to the same procedure as described in previous Test (B) according to the second drying method.

TABLE 6

| Components | Basic LCC concrete (%) |
| --- | --- |
| Tabular alumina 3-6 mm | 33 |
| Tabular alumina 8-14 mesh (i.e. 2.38-1.4 mm) | 16 |
| Tabular alumina 28-48 mesh (i.e. 0.6-0.3 mm) | 6 |
| Tabular alumina <48 mesh (i.e. <0.3 mm) | 5 |
| Sintered spinel 0.5-1.0 mm | 9 |
| Sintered spinel 0-0.5 mm | 4 |
| Sintered spinel 0-0.09 mm | 10 |
| Reactive alumina | 11 |
| Secar ® 71 | 6 |
| Total | 100 |

For 100 parts by weight of basic concrete according to basic composition given in Table 6 hereabove, various adjuvant compositions have been studied (Table 7):

TABLE 7

| Tested concretes | Components of the adjuvant of the invention (%) | | | Other additives | Permeability (mD) | Consistency (mm) |
| --- | --- | --- | --- | --- | --- | --- |
| | aluminum lactate | sodium polyacrylate | magnesia | (%) Peramin Al200 | | |
| B16 | — | — | — | 0.02 | 0.02 | 200 |
| B17 | 1.00 | 0.20 | — | — | 0.75 | 195 |
| B18 | 1.00 | 0.20 | 0.50 | — | 1.1 | 190 |

The mixing rate with water for all concretes B16 to B18 tested is 5.00%.

As with the previous test illustrated in Table 5, Table 7 shows that the permeability is higher when the concrete comprises the adjuvant of the invention B18. Indeed, a very low permeability is obtained when concrete B16 is enriched as an adjuvant with a deflocculant according to the prior art, here especially Peramin Al200®. This value is improved when two components of the adjuvant of the invention are added and even more improved when the three are added, especially aluminum lactate, sodium polyacrylate and magnesia. Indeed, an increase in permeability of more than 47% can be observed if comparing concretes B17 and B18.

Thus, this really is the combination of these components, which enables to increase the permeability of the refractory concretes, without impairing their mechanical resistance and reliability, as has been demonstrated in the hereabove test B).

Although the present invention has been described in relation with a particular embodiment, it should be understood that in no way it is limited thereto, and that it includes all the technical equivalents of the described means, as well as combinations thereof, provided these are within the scope of the present invention.

The invention claimed is:

1. An adjuvant for a composition based on a hydraulic binder, comprising, by weight, as compared to its total weight, at least:
   (a) from 20% to 70% of at least one aluminum organic acid,
   (b) from 3% to 20% of at least one deflocculant chosen from a carboxylic acid polymer, a carboxylic acid, a salt thereof, or one of their mixtures, and,
   (c) from 7% to 44% of at least one mineral oxide.

2. The adjuvant according to claim 1, comprising
   (a) from 48% to 61% of said aluminum organic acid,
   (b) from 5% to 13% of said deflocculant, and
   (c) from 19% to 34% of said mineral oxide.

3. The adjuvant according to claim 1, wherein the (c) mineral oxide has a specific surface area BET between 0.5 square meters per gram ($m^2/g$) and 3 $m^2/g$.

4. The adjuvant according to claim 1, wherein the organic acid of said organic acid aluminum (a) is selected from: monocarboxylic acid, dicarboxylic acid, hydroxy acid or a mixture thereof.

5. The adjuvant according to claim 4, wherein said monocarboxylic acid is selected from formic acid, acetic acid, propionic acid, n-butanoic acid, valeric acid, or mixture thereof, said dicarboxylic acid is selected from: oxalic acid, succinic acid, maleic acid, malonic acid, fumaric acid, glutaric acid, or mixture thereof and said hydroxy acid is selected from: glycolic acid, lactic acid, tartaric acid, malic acid, citrate, or mixture thereof.

6. The adjuvant according to claim 1, wherein (a) said aluminum organic acid is aluminum lactate.

7. The adjuvant according to claim 6, wherein (a) aluminum lactate has a lactic acid to alumina weight ratio ranging from 1.0 to 3.0.

8. The adjuvant according to claim 1, wherein the carboxylic acid polymer or one of its salts is chosen from an acrylic acid polymer, a polyacrylic acid polymer, a methacrylic acid polymer, a salt thereof, or one of their combinations.

9. The adjuvant according to claim 8, wherein (b) said deflocculant is sodium polyacrylate having a degree of polymerization between 2 000 and 10 000.

10. The adjuvant according to claim 1, wherein the carboxylic acid or one of its salts is chosen from citric acid or one of its salts.

11. The adjuvant according to claim 1, wherein (c) the mineral oxide is a metal oxide chosen from magnesium oxide, or a salt thereof.

12. A cement composition comprising, by weight as compared to said cement composition total weight, at least:

from 20% to 70% of a hydraulic binder, and from 30% to 80% of the adjuvant according to claim 1, optionally from 0 to 10% of other additives.

13. A refractory concrete composition comprising at least, by weight as compared to the refractory concrete composition total weight, from 1% to 5% of a cement composition such as defined in claim 12, and from 95% to 99% of a granular mixture composed of at least one aggregate and fines.

14. The refractory concrete composition according to claim 13, wherein aggregate is chosen from dolomite, magnesia, alumina silicates, tabular alumina, calcined bauxites, fused alumina, synthetic mullite, spinel or one of their combinations.

15. A method for improving the drying time of a refractory concrete composition, comprising providing the adjuvant according to claim 1, and adding the adjuvant to the refractory concrete composition.

16. A method for improving the permeability of a refractory concrete composition, comprising providing the adjuvant according to claim 1, and adding the adjuvant to the refractory concrete composition.

17. The adjuvant according to claim 7, wherein (a) aluminum lactate has a lactic acid to alumina weight ratio ranging from 1.2 to 1.6.

18. The adjuvant according to claim 8, wherein (b) the carboxylic acid polymer is a sodium polyacrylate.

19. The adjuvant according to claim 9, wherein (b) sodium polyacrylate has a degree of polymerization between 3 500 and 8 000.

20. The adjuvant according to claim 1, wherein (c) the mineral oxide is magnesium oxide, or a mineral species composed of calcium carbonate and magnesium oxide.

* * * * *